(12) United States Patent
Cho et al.

(10) Patent No.: US 11,420,538 B2
(45) Date of Patent: Aug. 23, 2022

(54) SEAT ELEVATING DEVICE

(71) Applicant: DAECHANG SEAT CO., LTD-DONGTAN, Gyeonggi-do (KR)

(72) Inventors: Chan Ki Cho, Gwangju (KR); Bum Jin Hwang, Seoul (KR); Jun Kyu Park, Gyeonggi-do (KR); Lyang Sun Kim, Gyeonggi-do (KR)

(73) Assignee: DAECHANG SEAT CO., LTD-DONGTAN, Gyeonggi-do (KR)

( * ) Notice: Subject to any disclaimer, the term of this patent is extended or adjusted under 35 U.S.C. 154(b) by 0 days.

(21) Appl. No.: 17/229,201

(22) Filed: Apr. 13, 2021

(65) Prior Publication Data

US 2021/0316641 A1    Oct. 14, 2021

(30) Foreign Application Priority Data

Apr. 14, 2020    (KR) .................... 10-2020-0045191

(51) Int. Cl.
*B60N 2/16*    (2006.01)
*B60N 2/02*    (2006.01)

(52) U.S. Cl.
CPC .......... *B60N 2/165* (2013.01); *B60N 2/0232* (2013.01); *B60N 2002/0236* (2013.01)

(58) Field of Classification Search
CPC ........ B60N 2/165; B60N 2/1635; B60N 2/16; B60N 2/0232; B60N 2/02; B60N 2/0224; B60N 2002/0236

(Continued)

(56) References Cited

U.S. PATENT DOCUMENTS 1,957,785 A * 5/1934 Knapp .................. B60N 2/067
248/394
4,487,391 A * 12/1984 Rampel ................ B60N 2/0232
188/83

(Continued)

FOREIGN PATENT DOCUMENTS

CN    111976554    * 11/2020
DE    1654294 A1    3/1972

(Continued)

OTHER PUBLICATIONS

European Patent Office (EPO) dated Sep. 16, 2021, concerning the corresponding EP patent application 21168044.2.

(Continued)

*Primary Examiner* — Mark R Wendell
(74) *Attorney, Agent, or Firm* — The Dobrusin Law Firm, P.C.

(57) ABSTRACT

Disclosed is a seat elevating device including a support unit, a driving unit, and an elevating unit. The support unit is structured such that a first end is coupled to a body of a vehicle and a second end extends upward from the first end and is connected to a first end and a second end of a bar. The driving unit is coupled to an inner side surface of the support unit and equipped with a drive shaft on a side surface thereof. The elevating unit is connected to the drive shaft via a gear unit and is provided with a groove to receive the bar so that the bar slides along the groove. The elevating unit is slidable because it is engaged with the gear unit connected to the drive shaft via a rack gear that extends in parallel with a sliding movement direction of the elevating unit.

9 Claims, 7 Drawing Sheets (58) Field of Classification Search
 USPC .................................................. 297/344.18
 See application file for complete search history.

(56) References Cited

U.S. PATENT DOCUMENTS

| | | | | |
|---|---|---|---|---|
| 4,632,353 | A | * | 12/1986 | Mattson ................. B60N 2/163 |
| | | | | 248/396 |
| 4,765,582 | A | * | 8/1988 | Babbs .................. B60N 2/1885 |
| | | | | 74/89.17 |
| 6,398,307 | B1 | * | 6/2002 | Schmidt ............... B60N 2/0232 |
| | | | | 297/337 |
| 7,654,615 | B2 | * | 2/2010 | Ventura ................ B60N 2/1896 |
| | | | | 297/344.15 |
| 2021/0197693 | A1 | * | 7/2021 | Runde .................... B60N 2/067 |

FOREIGN PATENT DOCUMENTS

| | | | |
|---|---|---|---|
| DE | 3143122 A1 | | 5/1983 |
| EP | 0301461 A2 | | 2/1989 |
| JP | 5857667 | * | 12/2015 |
| KR | 2019960004577 U | | 2/1996 |
| KR | 20-0229015 A | | 9/2001 |
| KR | 1020090025600 | * | 3/2009 |
| KR | 10-1689702 A | | 12/2016 |
| KR | 1020170062021 A | | 6/2017 |
| KR | 1020180005344 A | | 1/2018 |

OTHER PUBLICATIONS

Office Action issued by the Korean Intellectual Property Office (KIPO) dated May 12, 2021, concerning the corresponding KR patent application 10-2020-0045191.

Decision to Grant a Patent issued by the Korean Intellectual Property Office (KIPO) dated Nov. 10, 2021 concerning the corresponding KR patent application 10-2020-0045191.

* cited by examiner

SEAT ELEVATING DEVICE

CLAIM OF PRIORITY

The present application claims priority to Korean Patent Application No. 10-2020-0045191, filed Apr. 14, 2020, the entire contents of which is incorporated herein for all purposes by this reference.

FIELD OF THE INVENTION

The present disclosure relates to a seat elevating device and, more particularly, to a seat elevating device combined with a seat.

BACKGROUND OF THE INVENTION

Description of the Related Art

Unless otherwise stated herein, the statements in this section merely provide background information related to the present disclosure and do not constitute prior art.

In general, an elevating device mounted at a lower portion of a vehicle seat absorbs an impact applied to a seat during driving and controls the height of the occupant, thereby providing the occupant driving comfort.

Existing seat elevating devices have a problem in that seat movable directions are fixed when manufactured. To change the seat movable directions in an existing vehicle, the vehicle needs to be reassembled to have a wider free room space for flexible movement of a vehicle seat.

In this regard, Korean Patent No. 10-1689702 discloses a rack gear-type lift, and Korean Utility Model No. 20-0229015 discloses a device for adjusting height of a vehicular suspension seat.

However, none of the documents of the related art disclose a technique being capable of stably supporting the occupant as well as of elevating a vehicle seat.

SUMMARY OF THE INVENTION

One objective of the present disclosure is to provide a seat elevating device that can control the height adjustment of a vehicle seat with the use of a single motor.

Problems to be solved by the present disclosure are not limited to the above-described technical problem and other technical problems that are not described herein can also be solved by the present disclosure.

One embodiment of the present disclosure provides a seat elevating device including: a support unit having a first end coupled to a body of a vehicle and a second end extending upward from the first end to surround a space and being connected to a first end and a second end of a bar; a driving unit coupled to an inner side surface of the support unit and equipped with a drive shaft on a side surface thereof; and an elevating unit connected to the drive shaft via a gear, provided with a sliding groove through which the bar is inserted, and configured to slide up and down along with the support unit, in which the elevating unit moves by being connected to the gear connected to the drive shaft via a rack gear extending in parallel to a sliding movement direction of the elevating unit.

The support unit may include a base plate, first posts respectively coupled to respective upper portions of first and second sides of the base plate, and a roller post connected between the first posts and coupled to an upper end of the driving unit.

Each of the first posts may be structured such that a first end portion thereof is in close contact with a first side or a second side of the base plate, and a second end portion thereof has a triangular plate shape tapered to the top, in which the triangular plate-shaped second end portions of the respective first posts are in parallel and face each other.

The support unit may include a bracket structured such that a first end portion thereof has a rectangular plate shape and is coupled to a lower portion of an outer side surface of the support unit and a second end portion thereof extends toward the drive shaft and is pivotably coupled to the drive shaft.

The support unit may include a shock absorber structured such that a first end portion thereof is pivotably coupled to a side surface of the support unit and a second end portion thereof extends upward in parallel with the sliding movement direction and is pivotably coupled to the elevating unit.

The support unit may include a first hook that is coupled to a side surface of the second end portion, has a hook-shaped cross-section, and extends upward in parallel with the sliding movement direction of the elevating unit.

The elevating unit may include: two second posts respectively inserted into both sides of the driving unit; a rack-type gear unit engaged with either one of the two second posts; and a second hook coupled to either one of the two second posts and slidably coupled to the first hook.

In addition, the elevating unit may include: a lower rail having lower side walls on the top thereof; an upper rail provided with upper side walls formed to cross the lower side walls at the bottom thereof, disposed on the lower rail, and coupled to a seat; and bearing units disposed between the upper side walls and the lower side walls.

The seat elevating device according to one embodiment of the present disclosure can easily change the sliding movement direction by replacing some parts thereof and easily adjust the height of the seat by using an electric-powered mechanism rather than a gas lift mechanism.

The seat elevating device has the advantage of stably fixing the motor using a separate bracket, and the advantage of stably supporting the drive shaft of the motor, to which a load is applied during the sliding movement.

The seat elevating device has the advantage of effectively distributing the load of a rear impact applied from the rear side of a vehicle due to the presence of the support unit including multiple posts and an inclined portion on the rear side thereof.

In addition, since the effects of the present disclosure described above are expected to be obtained by the presented configuration regardless of whether or not the inventor perceives them, the effects described above should not be construed to include all the effects that can be achieved by the present disclosure.

In addition, the effects of the present disclosure should be further found by referring to the entire description of the specification. Even if not stated in an explicit sentence, effects that those skilled in the art to which the written description belongs recognize from the following description should be regarded as effects described in this specification.

BRIEF DESCRIPTION OF THE DRAWINGS

FIGS. 2 and 3 are exploded perspective views of the same seat elevating device as in FIG. 1;

DESCRIPTION OF THE PREFERRED EMBODIMENTS

Hereinafter, the configuration, operation, and effects of a seat elevating device according to the preferred embodiment of the present disclosure will be described with reference to the accompanying drawings. In addition, each component is not illustrated in actual dimensions or scales but is illustrated in an exaggerated manner. Further, like reference numerals refer to like components throughout the description and drawings, and some reference numerals denoting same components are omitted in some figures of the drawings.

Figure 1:
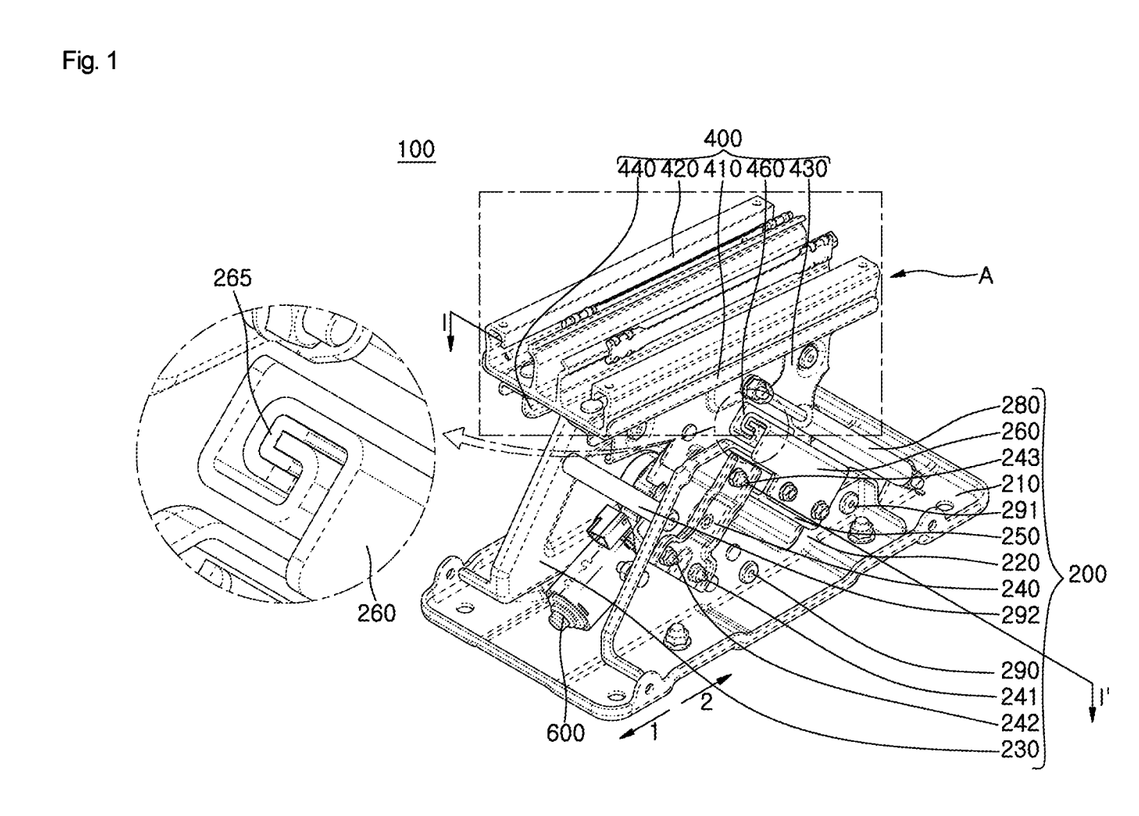
FIG. 1 is a perspective view of a seat elevating device according to one embodiment of the present disclosure.
Figure 2:
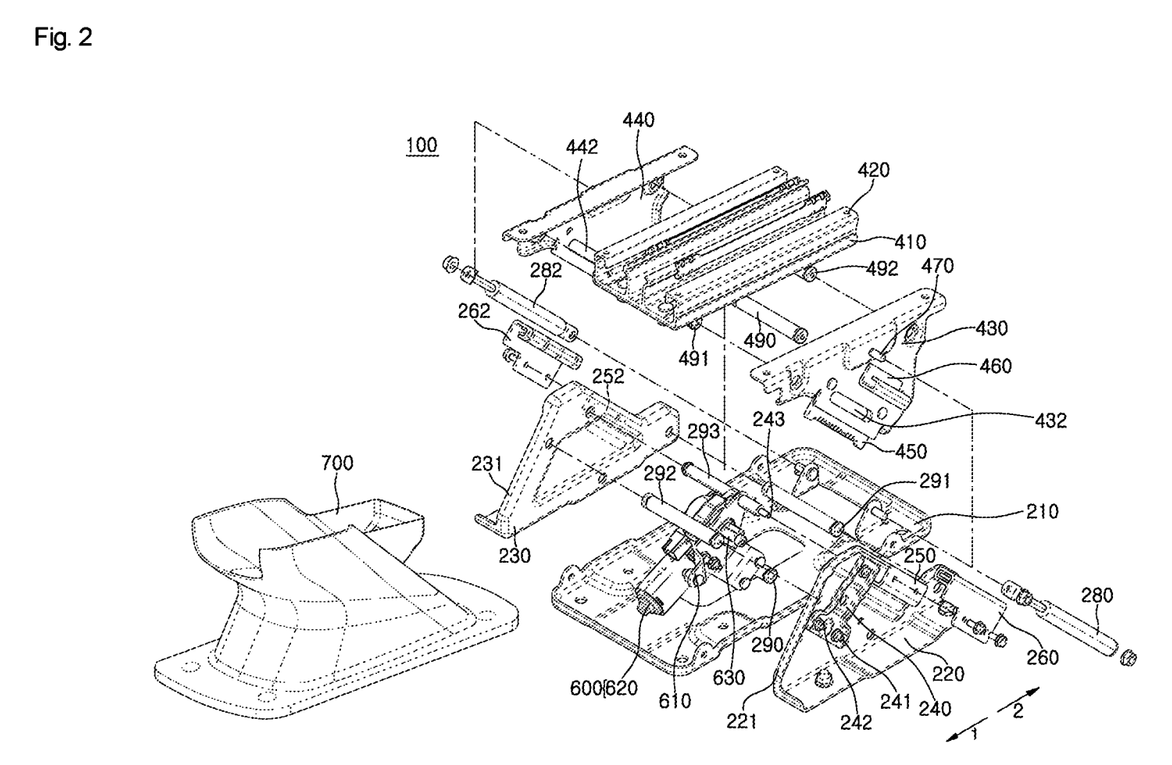
Figure 3:
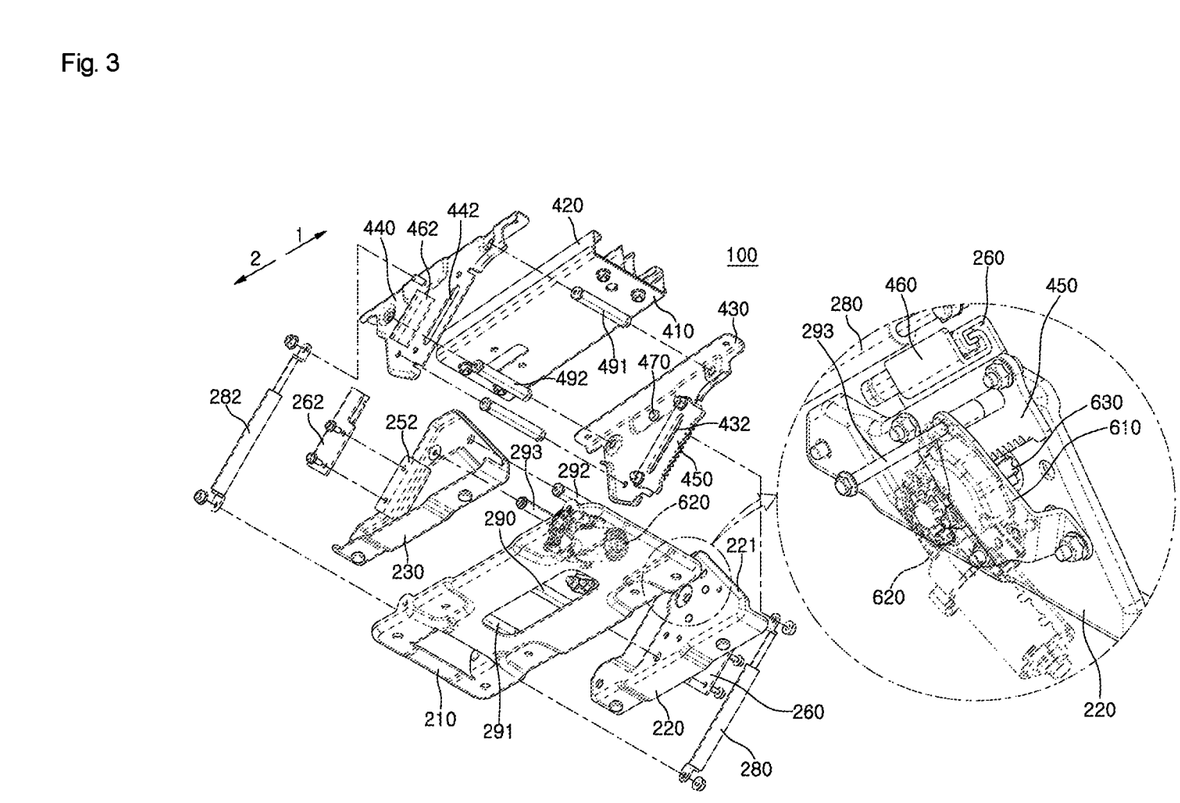
FIG. 3 is a perspective view of the same seat elevating device as in FIG. 1, which is viewed from a different angle.
Figure 4:
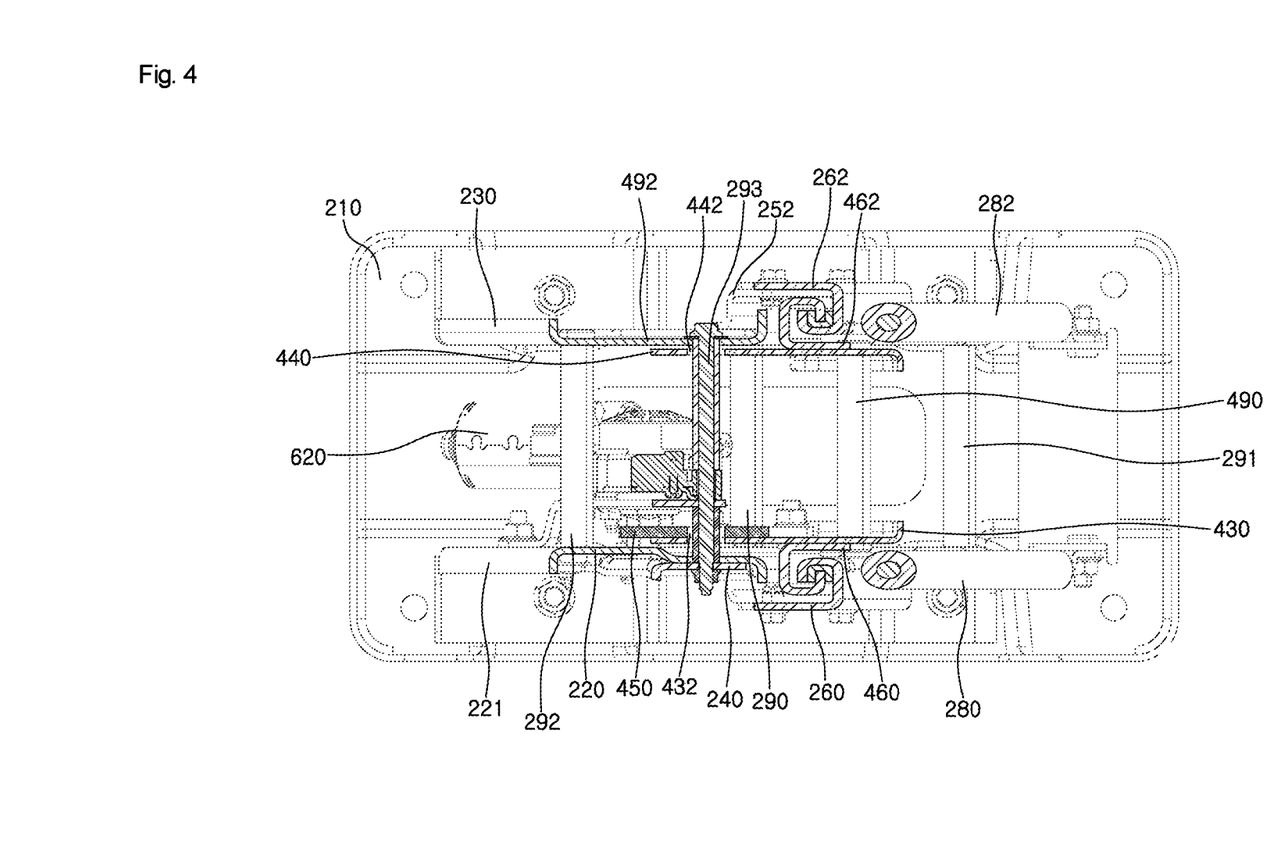
FIG. 4 is a cross-sectional view taken along line I-I' of FIG. 1.
Figure 5:
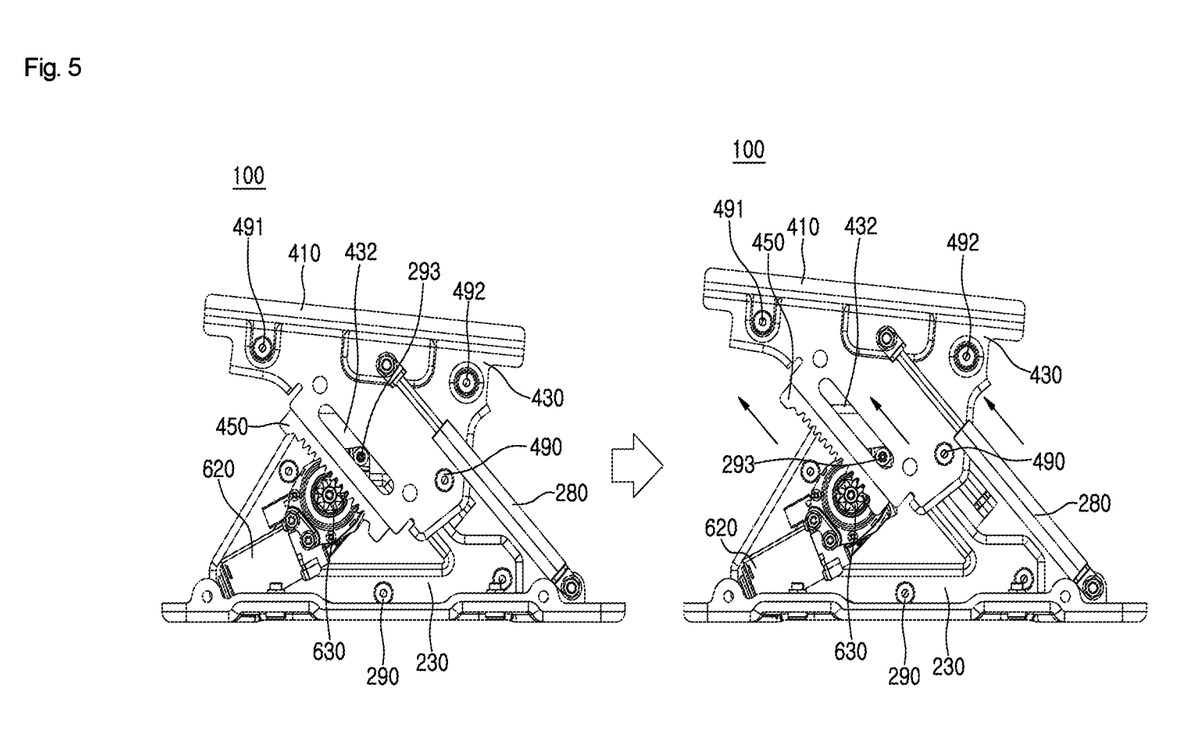
FIG. 5 is a side elevation illustrating operation of the same seat elevating device as in FIG. 1.

FIG. 1 is a perspective view of a seat elevating device according to one embodiment of the present disclosure. FIGS. 2 and 3 are exploded perspective views of the same seat elevating device as in FIG. 1. FIG. 3 is a perspective view of the same seat elevating device as in FIG. 1, which is viewed from a different angle. FIG. 4 is a cross-sectional view taken along line I-I' of FIG. 1. FIG. 5 is a side elevation illustrating operation of the same seat elevating device as in FIG. 1.

Referring to FIGS. 1 through 5, a seat elevating device 100 includes a support unit 200, an elevating unit 400, a driving unit 600, and a cover unit 700.

In general, an elevating device mounted at a lower portion of a vehicle seat absorbs an impact applied to a seat during driving and controls the height of the occupant, thereby providing the occupant a driving comfort.

Existing seat elevating devices have a problem in that seat movable directions are fixed when manufactured. To change the seat movable directions in an existing vehicle, the vehicle needs to be reassembled to have a wider free room space for flexible movement of a vehicle seat.

The elevating device 100 is easy to control the direction of movement of a seat because the elevating device 100 is structure such that some components thereof can be easily replaced. In addition, the elevating device 10 can adjust the height of a seat base with an electric lift mechanism instead of a pneumatic or gas lift mechanism.

The elevating device 100 has further advantages such that a motor thereof can be stably mounted with the use of a separate bracket and a motor drive shaft to which a load is applied during the lifting drive process is also stably supported.

The support unit 200 includes a base plate 210, first posts 220 and 230, brackets 240, 250, and 252, first to third bolts 241, 242, and 243, and first hooks 260 and 262, a shock absorber, connection posts 290, 291 and 292, and a roller post 293.

The support unit 200 has a first end portion that is a lower portion and which is coupled to the body of a vehicle, and a second end portion extending from the first end portion and having a plate shape. The support unit 200 is connected to the elevating unit 400 through a circular bar extending toward a first and or a second side so as to slide.

The base plate 210 has a rectangular tray shape that extends in a first direction (forward direction) 1 or a second direction (backward direction) 2 which is opposite to the first direction 1, and has a raised rim at the edge thereof.

A first end portion of the first post 220 is a plate-like member extending in the first direction 1 or the second direction 2 and is coupled to an upper portion of a first side of the base plate 210. A second end portion of the first post 220 has a triangular plate shape and bents and extends upward from the first end portion disposed inside the base plate 210.

Partial edge portions (on the first direction side and the second direction side) of the first end portion of the first post 220 are bent upward, and a partial edge portion of the second end portion is bent toward a first side to form a bent portion 221. The bent portion 221 of the first post 220 prevents the first post 220 from being deformed, thereby enabling a seat to be stably supported.

A first end portion of the first post 230 is a plate-like member extending in the first direction 1 or the second direction 2 and is coupled to an upper portion of the second side of the base plate 210. A second end portion of the first post 230 has a triangular plate shape that bends and extends upward from an inner portion of the first end portion. The second end portion of the first post 230 is in parallel with the second end portion of the first post 220.

Partial edges (on the first direction side and the second direction side) of the first end portion of the first post 230 are bent upward. A partial edge of the second end portion of the first post 230 is bent toward the second side to form a bent portion 231. raised. The bent portion 231 suppresses the first post 230 from being deformed so that the seat can be stably supported.

A first end of the bracket 240 has a rectangular plate shape, and is coupled to the first post 220 by first and second bolts 241 and 242. Specifically, the first end of the bracket 240 is coupled to a first side surface on the first direction side of the second end portion of the first post 220.

The first end of the bracket 240 is structured such that one of the corners is disposed at the lower portion close to the first portion of the first post 220, and the relatively long edges of the bracket 240, which are parallel to each other, extend obliquely upward in the second direction 2.

In regard to a center portion of the bracket 240, a portion on the second direction side and the upper side of the first end portion of the bracket 240 has a plate shape and extends obliquely upward in the second direction 2 by a predetermined length. The portion is connected to the drive shaft of the driving unit 600. On the other end, the second end portion extends in the same direction from the center portion by a predetermined length and is pivotably coupled to the roller post 293.

Accordingly, when the bracket 240 receives a load applied to the drive shaft of the driving unit 600 connected to the center portion of the bracket 240, the load is transmitted to the lower portion of the second end portion of the first post 220 which is more resistant to deformation than the upper portion of the second end portion of the first post 220. This structure improves the resistance against the load applied to the drive shaft.

In the case where the drive shaft of the driving unit 600 is coupled to the bracket 240, the drive shaft is more stably supported by the supporting forces of the first and second end portions of the bracket 240 than the case where the drive shaft of the driving unit 600 is coupled only to the upper portion of the second end portion of the first post 220.

The first end portion of the bracket 250 has a plate shape extending obliquely upward in the first direction and is coupled to a first side surface of the second end portion of the first post 220 on the second direction side of the bracket 240.

The second end portion of the bracket 250 bends and extends toward one side of the first post 220 from the first end portion thereof, and then bends and extends obliquely upward in the second direction 2. The second end portion of the bracket 250 is coupled to a portion of the first hook 260.

A first end portion of the first hook 260 has a plate shape and is coupled to the first side surface of the second end portion of the bracket 250 by bolts or screws, and a second end portion of the first hook 260 extends toward the second portion of the first post 220 from the first end portion to form an overall J hook shape with an inner empty space. That is, the first hook 260 has a container shape that is open toward the first side.

The first end portion of the bracket 252 has a plate shape and extends obliquely upward in the first direction 1. The first end portion of the bracket 252 is coupled to a second side surface of the second end portion of the first post 230 while being disposed on the same horizontal line as the bracket 240.

The second end portion of the bracket 252 bends and extends toward the second end portion of the first post 230 from the first end portion thereof, then bends and extends obliquely upward in the second direction 2, and is coupled to a portion of the first hook 262.

A first end portion of the first hook 262 is formed in a plate shape and is coupled to the second side surface of the second end portion of the bracket 252 by bolts or screws, and a second end portion of the first hook 262 extends toward the second end portion of the first post 230 from the first end portion thereof to form an overall J hook shape with an inner empty space. The first hook 262 has a container shape that is open toward the second side.

An inner portion of the second end portion of each of the first hooks 260 and 262 is provided with a guide 265 having a U-shaped cross section. Each of the guides is disposed at an inner position than the end of the second end portion of each of the first hooks 260 and 262. The outer surface of each of the guides 265 is in tight contact with the inner surface of a corresponding one of the first hooks 260 and 262.

A first end of the shock absorber 280 is coupled to pivot about a shaft extending toward the first side or the second side at an upper portion on the first side (the second direction side) of the base plate 210, and a second end of the shock absorber 280 extends obliquely upward in the first direction 1 and is pivotably coupled to an upper portion of a first side of the elevating unit 400.

A first end portion of the shock absorber 282 is coupled to pivot about a shaft extending toward the first side or the second side at an upper portion on the second side (second direction side) of the base plate 210, and a second end portion of the shock absorber 280 extends obliquely upward in the first direction 1 and is rotatably coupled to an upper portion of a second side of the elevating unit 400.

The second end of each of the shock absorbers 280 and 282 is inserted into the first end of the elevating unit 400 when the elevating unit 400 is lowered, thereby preventing the elevating unit 200 from being suddenly and quickly lowered, resulting in reduction in a vertical impact.

The connection post 290 has a cylindrical shape extending toward the first side or the second side, and is connected between the two first posts 220 and 230 specifically at the lower end of the second end of each of the first posts 220 and 230, thereby preventing the second end of each of the first posts 220 and 230 from being deformed.

The connection post 291 has a cylindrical shape extending toward the first side or the second side, and is connected between the two first posts 220 and 230 specifically at a position on the second direction side of the second end of each of the first posts 220 and 230, thereby preventing the second end of each of the first posts 220 and 230 from being deformed.

The connection post 292 has a cylindrical shape extending toward the first side or the second side, and is connected between the two first posts 220 and 230 specifically at a position on the first direction side of the second end of each of the first posts 220 and 230, thereby preventing the second end of each of the first posts 220 and 230 from being deformed.

A first end of the roller post 293 is coupled to pivot about a shaft extending toward the first side or the second side at an upper portion of the second end portion of the first post 220 on the second direction side of the connection post 292, and a second end of the roller post 293 extends toward the second end of the first post 230 and is rotatably coupled to the first post 230.

The first end portion of the roller post 293 is pivotably coupled to the second end portion of the bracket 240 while passing through the first post 220, and the load transferred from the elevating unit 400 is transmitted toward a lower portion of the second end portion of the first post 220 through the bracket 240. Therefore, the load applied to an upper portion of the second end portion of the first post 220 is distributed.

The elevating unit 400 includes an upper plate 410, a rail unit 420, second posts 430 and 440, a gear unit 450, second hooks 460 and 462, a pivot shaft 470, and connection posts 490, 491, and 492.

The first end portion of the elevating unit 400 is gear-connected to the drive shaft of the driving unit 600 coupled to the support unit 200 and is formed to surround the roller post 293, and the second end portion of the elevating unit 400 extends from the first end portion and expands toward the top of the elevating unit. The second end portion of the elevating unit 400 is coupled to a seat via the rail unit.

Specifically, the upper plate 410 is formed in the shape of a square plate extending in the first direction 1 or the second direction 2. A portion of the edge of each of the first and second sides is formed to bend and extend toward the top, thereby coming into tight contact with both side surfaces of the rail unit 420.

The rail unit 420 is coupled to the lower end of a seat so that the seat can slide in the first direction 1 or the second direction 2. The sliding movement of the seat in the first direction 1 or the second direction 2 on the rail unit 420 may be controlled with a control device.

A first end of the second post 430 is formed in a plate shape extending in the first direction 1 or the second direction 2 and is coupled to the lower edge of one side of the upper plate 410, and a second end of the second post 430 is formed in a triangular plate shape that is tapered toward the bottom.

The sliding groove 432 is formed such that a portion of a first side extending in the first direction and upward in parallel with the first edge, at a position adjacent to the first edge that is disposed under the second post 430 in the first direction 1, is recessed toward the second side of the support unit 200, thereby connecting a first side space and a second side space of the second post 430 to each other.

A first end portion of the second post 440 is formed in a plate shape extending in the first direction 1 or the second direction 2. The first end portion is coupled to a lower surface of a second side edge of the upper plate 410, and a second end portion of the second post 430 is formed in a triangular plate shape that is tapered toward the bottom.

The sliding groove 442 is formed such that a portion of a second side extending in the first direction 1 and upward in parallel with the second edge, at a position adjacent to the second edge that is disposed under the second post 440 in the first direction 1, is recessed toward the first side of the support unit 200, thereby connecting a first side space and a second side space of the second post 440 to each other.

A first end portion of the gear unit 450 is formed in a square plate is obliquely coupled to an inner surface of the second post 430 in the first direction 1 such that the relatively long edges of the four edges extend in the direct direction 1 and toward a lower portion.

The first end portion of the gear unit 450 is provided with a groove that extends obliquely upward in the first direction. In a state in which the first end portion of the gear unit 450 is coupled to the second post 430, the groove is connected to the sliding groove 432.

The groove formed in the first end portion of the gear unit 450 has the same shape as the sliding groove 432. In a state in which the first end portion of the gear unit 450 is coupled to the second post 430, the groove is connected to the sliding groove 432.

A second end portion of the gear unit 450 extends downward and in the first direction 1 from the first end portion, and the end of the second end portion is provided with a rack gear to be meshed with the drive shaft of the driving unit 600.

With the support unit 200 and the elevating unit 400 being engaged with each other, the first end portion of the roller post 293 is disposed in the sliding groove 432 and is coupled to the first post 220 and the bracket 240 by a third bolt 342.

With the support unit 200 and the elevating unit 400 being engaged with each other, the second end portion of the roller post 293 is disposed in the sliding groove 442 and is pivotably coupled to the second end portion of the first post 220.

A first end portion of the second hook 460 has a plate shape extending obliquely upward in the first direction and is coupled to the first side surface of the second post 430 corresponding to the second direction side of the gear unit 450.

The second end of the second hook 460 is formed in the form of a J hook in which a portion of the edge on the first direction side is bent perpendicularly and extends toward the first side of the second post 430 and is then bent upward and in the second direction 2.

The second end of the second hook 460 protrudes toward the first side of the first post 220 in the space on the second direction side of the first post 220 and is slidably coupled to the second end of the first hook 260.

In a state in which the support unit 200 and the elevating unit 400 are engaged, the second hook 460 is engaged with the first hook 260 in a manner that the tip of the second end portion of the second hook 460 moves into the guide 265 attached to the tip of the second end portion of the first hook 260, and then slides along an elongated direction of the first hook 260 so as to be able to slide along the extension direction of the hook 260.

The first end portion of the second hook 462 has a plate shape extending obliquely upward in the first direction and is coupled to a second side surface of the second post 440 on the second direction side of the gear unit 450.

The second end portion of the second hook 462 is formed such that a portion of an edge of the first end portion on the first direction side is orthogonally bent, extend toward the second side of the second post 440, and is bent upward in the second direction 2, thereby forming an overall J-shaped hook.

The second end portion of the second hook 462 protrudes toward the second side of the first post 230 in the second direction side space of the first post 230 and slidably engages with the second end portion of the first hook 262.

In a state in which the support unit 200 and the elevating unit 400 are engaged, the second hook 462 is engaged with the first hook 262 in a manner that the tip of the second end portion of the second hook 460 moves into the guide 265 attached to the tip of the second end portion of the first hook 262, and then slides along the elongated direction of the first hook 262.

Accordingly, in the elevating unit 400, the second end portion of the gear unit 450 engaged with the drive shaft is moved upward by the forward rotation of the drive shaft, and is then guided to move upward in the first direction 1 by the roller post 293 inserted into the sliding grooves 432 and 442.

In addition, the elevating unit 400 can be stably raised and lowered due to the double-guided mechanism because the second hooks 460 and 462 are slidably engaged with the first hooks 260 and 262, respectively.

The connection post 490 has a cylindrical shape and extends toward the first side or the second side. The first end and the second end of the connection post 490 are coupled to the second end of the second post 430 and the second end of the second post 440, respectively, so that the connection post 490 connects the second post 430 and the second post 440 to each other.

The connection post 491 extends in a cylindrical shape toward the first side or the second side, and the first end and the second end thereof are coupled to the first end of the second post 430 and the first end of the second post 440, respectively, specifically at the positions on the inner side surfaces on the first direction side. Thus, the connection post 491 connects the second post 430 and the second post 440 to each other.

The connection post 492 has a cylindrical shape extending toward the first side or the second side, and the first end and the second end of the connection post 492 are coupled to the first end of the second post 430 and the first end of the second post 440, respectively, specifically at the positions on the inner side surfaces on the second direction side. Thus, the connection post 492 connects the second post 430 and the second post 440 to each other.

The driving unit 600 includes a bracket 610, a motor 620, and a pinion gear 630.

The first end of the driving unit 600 is coupled to the support unit 200 while surrounding the roller post 293 provided at the second end of the support unit 200, and the second end of the driving unit 600 extends obliquely downward in the first direction 1 from the first end of the driving unit 600 and is coupled to the first side of the support unit 200.

The drive shaft of the driving unit 600 is engaged with the gear unit 450 of the elevating unit 400, so that the elevating unit 400 reciprocates obliquely upward or downward by the driving action of the driving unit 600.

Referring to FIGS. 2 and 3, the first end of the bracket 610 has a plate shape and surrounds the first end of the roller post 293 on the second side of the gear unit 450 between the first post 220 and the first post 230. The first end of the bracket 610 pivotably engages with the roller post 293 and the second end of the bracket 610 obliquely extends downward in the first direction 1 and engages with the first post 220.

A portion between the first end and the second end of the bracket 610 is recessed toward the second side to form a cavity 612 that connects the first side space and the second side space of the bracket 610.

The motor 620 is disposed between the first post 220 and the first post 230 and is coupled to the second side surface of the bracket 610. A pinion gear 630 coupled to the drive shaft connected to the motor 620 engages with the second end portion of the gear unit 450 disposed on the first side of the bracket 610 through the cavity 612.

Referring to FIG. 2, a first end portion of the cover unit 700 has a plate shape surrounding an area around the first posts 220 and 230 on the top of the base plate 210, and a middle portion of the cover unit 700 has a pipe shape with one end portion gradually reduced in diameter and covers the first posts 220 and 230.

A second end portion of the cover unit 700 extends upward while gradually expanding from the upper end of the middle portion, and surrounds the first end portion of the elevating unit 400. A front side and a rear side of the second end portion are provided with respective grooves along which the seat assembled with the rail unit 420 can move forward and backward.

Figure 6:
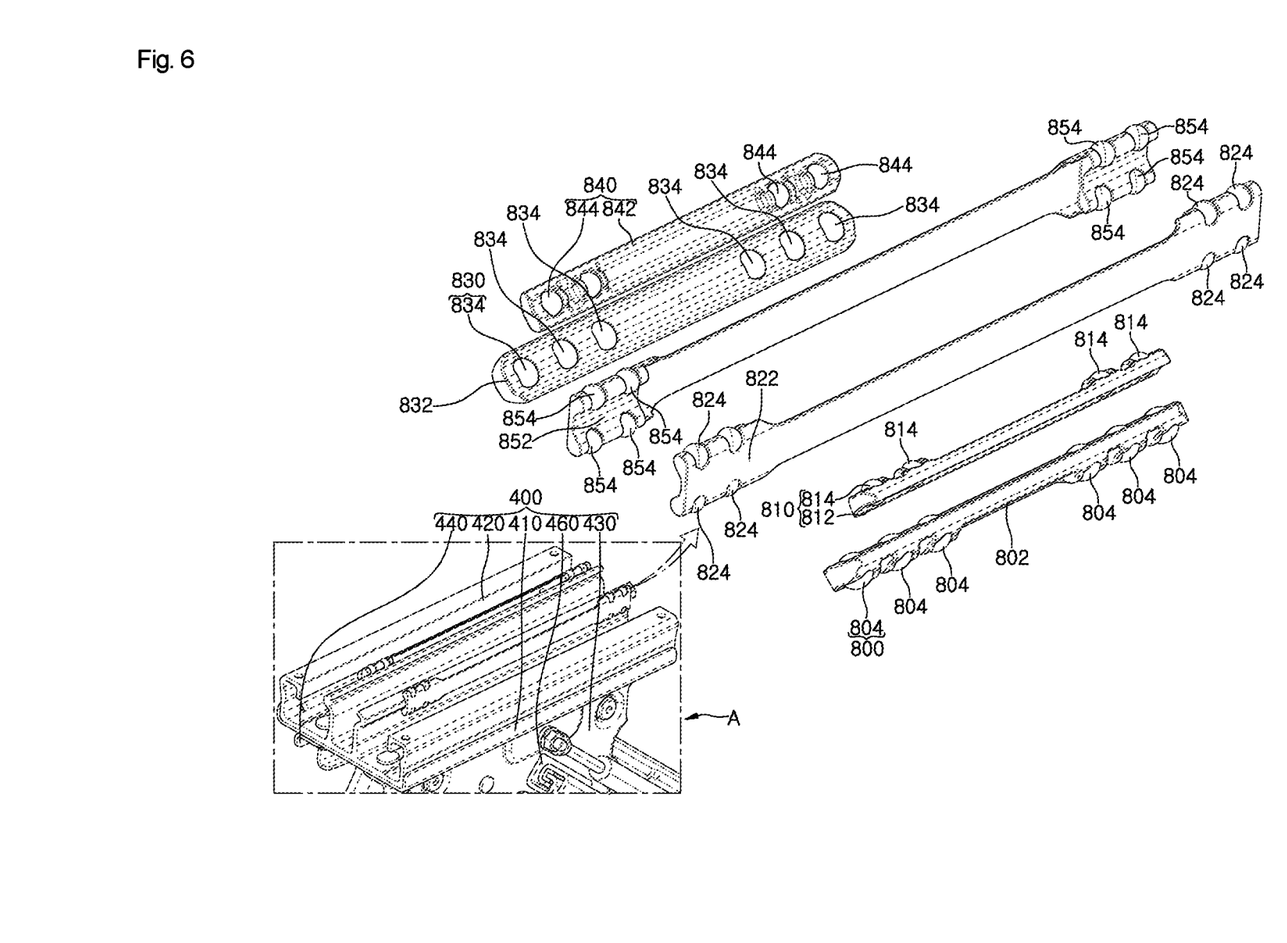
FIG. 6 is an enlarged perspective view of portion A of FIG. 1.
Figure 7:
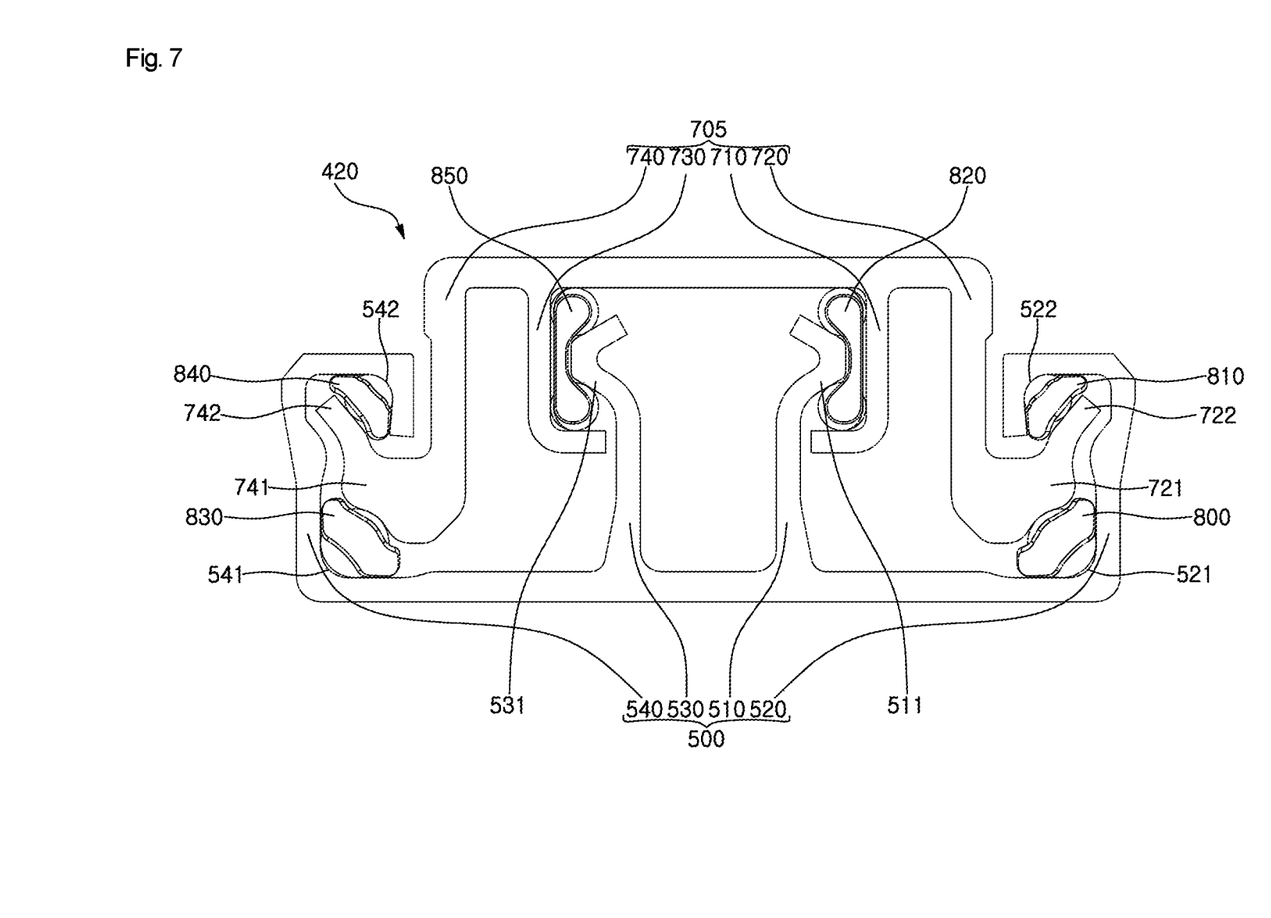
FIG. 7 is a front view of a rail portion of the same set elevating device as in FIG. 1.

FIG. 6 is an enlarged view of a portion 'A' of FIG. 1. FIG. 7 is a front view of the rail unit of the same set elevating device as in FIG. 1.

As illustrated in FIGS. 6 and 7, the rail unit 420 includes a lower rail 500, an upper rail 705, first bearings 800 and 830, second bearings 810 and 840, and third bearings 820 and 850.

The lower rail 500 includes a lower vertical portion 510, an outer portion 520, a lower vertical portion 530 and an outer portion 540.

The lower end of the lower rail 500 has a plate shape and is in surface contact with the upper surface of the upper plate 410, and the upper end portion is provided with four plates extending upward in the first direction 1 or the second direction 2 from an inner portion and a frame portion of the lower end.

A first end portion of the lower vertical portion 510 has a plate shape extending in the first direction 1 or the second direction 2 and is coupled to the inside of the lower rail 500, and a second end portion of the lower vertical portion 510 is provided with a protrusion 511 having an arch-shaped cross section and extending upward from the first end portion and then extending outward from a side surface.

The first end portion of the lower vertical portion 530 has a plate shape extending in the first direction 1 or the second direction 2 and is coupled to an upper portion of the lower rail 500 while being spaced apart toward the second side of the lower vertical portion 510 from the inside of the lower rail 500. The second end portion of the lower vertical portion 530 first extends upward from the first end portion and is provided with a protrusion 531 having an arc-shaped cross section and protruding toward the second side.

A first end of the outer portion 520 is in the form of a side wall extending in the first direction 1 or the second direction 2 from the first side of the lower rail 500, and a second end of the outer portion 520 is first bent inward from the first end portion and is then bent downward, thereby having a rectangular annular cross section.

An inner surface of the first end of the outer portion 520 is provided with a lower inner side surface 521 connected to the lower end of the lower rail 500 and formed at a corner portion, and the inward bent portion of the second end of the outer portion 520 is provided with an upper inner side surface 522.

A first end portion of the outer portion 540 is formed in the shape of a side wall extending in the first direction 1 or the second direction 2 from the second side of the lower rail 500, and a second end portion of the outer portion 540 is first bent inward from the first end portion and is then bent downward to form a rectangular annular cross section.

An inner surface of the first end of the outer portion 540 is provided with a lower inner side surface 541 connected to the lower end of the lower rail 500, and the inward bent portion at the second end of the outer portion 520 is provided with an upper inner side surface 542.

The upper rail 705 includes upper vertical portions 710 and 730 and upper outer portions 720 and 740.

An upper end of the upper rail 705 is formed in a plate shape extending in the first direction 1 or the second direction 2 and is coupled to the seat disposed thereon, and a lower end of the upper rail 750 is provided with four side walls that are formed such that the inner portions of the upper end extending in the first direction 1 or the second direction 2 extend downward.

The first end of the upper vertical portion 710 has a plate shape extending in the first direction 1 or the second direction 2 from the first side of the lower vertical portion 510, and is connected to the upper inner portion of the upper rail 705. The second end of the upper vertical portion 710 is bent toward the second side from a lower end of the protrusion 511.

A first end of the upper vertical portion 730 has a plate shape extending in the first direction 1 or the second direction 2 from the second side of the lower vertical portion 510 and is connected to a lower inner portion of the upper rail 750 while being disposed between the second side of the upper rail 705 and the upper vertical portion 710. A second end of the upper vertical portion 730 is bent toward the first side from a lower end of the protrusion 531.

A first end of the upper outer portion 720 is in the form of a side wall extending in the first direction 1 or the second direction 2 from one side surface of the upper rail 705 at a position between the upper vertical portion 710 and the outer portion 520, and a second end of the upper outer portion 720 obliquely bent upward and toward the first side from the first end and is inserted into the inside of the second end of the outer portion 520.

An inclined outer surface of the second end of the upper outer portion 720 is provided with a bent portion 721 facing the lower inner side surface 521, and an outer side surface of the second end of the upper outer portion 720, which corresponds to a portion between the first end and the second end of the upper outer portion, is provided with a tip portion 722 facing the upper inner side surface 522.

A first end of the upper outer portion 740 is formed in the shape of a side wall extending in the first direction 1 or the second direction 2 from the second side of the upper rail 705, which corresponds to a portion between the upper vertical portion 730 and the outer portion 540, and a second end of the upper outer portion 720 is obliquely bent toward the second side and the upper side from the first end and is inserted into the inside of the second end of the outer portion 540.

An inclined outer surface of the second end of the upper outer portion 720 is provided with a bent portion 741 facing the lower inner side surface 541, and an outer side surface of the second end of the upper outer portion 720, which corresponds to a portion between the first end and the second end of the upper outer portion, is provided with a tip portion 742 facing the upper inner side surface 542.

Each of the first bearings 800 and 830 includes a retainer 802 and balls 804.

A first end portion of the first bearing 800 is obliquely disposed with a first side thereof being higher than a second side thereof. The first end portion of the first bearing 800 is disposed in the form of a stick bearing between the bent portion 721 and the lower inner side surface 521 so that exposed balls are in tight contact with the bent portion 721 and the lower inner side surface 521. A second end portion of the first bearing 800 extends by a predetermined length in the second direction 2 and is disposed in the form of a steak bearing while being in tight contact with the bent portion 721 and the lower inner side surface 521.

A first end portion of the first bearing 830 is obliquely disposed with a second side thereof being higher than a side thereof. The first end portion of the first bearing 830 is disposed in the form of a stick bearing between the bent portion 721 and the lower inner side surface 521 so that exposed balls are in tight contact with the bent portion 721 and the lower inner side surface 521. A second end portion of the first bearing 800 extends by a predetermined length in the second direction 2 and is disposed in the form of a steak bearing while being in tight contact with the bent portion 721 and the lower inner side surface 521.

A first end of the retainer 802 inserted between the upper outer portion 720 and the lower rail 500 is formed in the form of a stick bearing surrounding three balls 804 spaced apart at equal intervals in the first direction 1 or the second direction 2. A second end of the retainer 802 extends in the second direction 2 from the first end and is formed in the form of a stick bearing in which three balls 804 are arranged and spaced at regular intervals in the first direction 1 or the second direction 2.

Each of the balls 804 is exposed to protrude from the outer surface of the retainer 802, so that the upper and lower surfaces of each of the balls are in close contact with the bent portion 721 and the lower inner side surface 521. This prevents an undesirable clearance from being formed between the upper outer portion 720 and the outer portion 520.

A first end of the retainer 802 inserted between the upper outer portion 740 and the lower rail 500 is formed in the form of a stick bearing surrounding three balls 804 spaced apart at equal intervals in the first direction 1 or the second direction 2. A second end of the retainer 802 extends in the second direction 2 from the first end and is formed in the form of a stick bearing in which three balls 804 are arranged and spaced at regular intervals in the first direction 1 or the second direction 2.

Each of the balls 804 is exposed so as to protrude from the upper outer surface and the lower outer surface of the retainer 802, so that the upper and lower surfaces of each of the balls 840 are in close contact with the bent portion 741 and the lower inner side surface 541, thereby preventing an undesirable clearance from being formed between the upper outer portion 740 and the outer portion 540.

Each of the second bearing portions 810 and 840 includes a retainer 812 and balls 814.

A first end of the second bearing 810 is formed in the form of a stick bearing and is obliquely disposed, with a first side being disposed higher than a second side, thereof. The first end of the second bearing 810 is in close contact with the upper inner side surface 522 and the end portion 722. A second end of the second bearing 810 extends from the first end in the second direction 2 and is in contact with the upper inner side surface 522 and the end portion 722.

A first end of the second bearing 840 is in the form of a stick bearing obliquely disposed between the upper inner side surface 542 and the end portion 742, with a second side thereof being disposed higher than a first side thereof. A second end of the second bearing 840 extends in the second direction 2 from the first end and is disposed in close contact with the upper inner side surface 542 and the tip portion 742.

A first end of the retainer 812 inserted between the end portion 722 and the upper inner side surface 522 is formed to partially surround two balls 814 spaced apart at equal intervals and arranged in the first direction 1 or the second direction 2, and a second end of the retainer 812 extends in the second direction 2 and partially surrounds two balls 814 that are spaced apart from each other in the first direction 1 or the second direction 2.

An upper portion and a lower portion of each of the balls 814 are exposed by protruding from the upper surface and the lower surface of the retainer 812, respectively. The upper surface and the lower surface of each of the balls are partially in close contact with the upper inner side surface 522 and the end portion 722.

A first end of the retainer 812 inserted between the end portion 742 and the upper inner side surface 542 is formed to partially surround two balls 814 spaced apart at equal intervals and arranged in the first direction 1 or the second direction 2, and a second end of the retainer 812 extends in the second direction 2 and partially surrounds the two balls 814 that are spaced from each other and arranged at regular intervals in the first direction 1 or the second direction 2.

An upper portion and a lower portion of each of the balls 814 are exposed by protruding from the upper surface and the lower surface of the retainer 812, respectively. The upper surface and the lower surface of each of the balls are partially in close contact with the upper inner side surface 542 and the end portion 742.

Each of the third bearing portions 820 and 850 includes a retainer 822 and a ball 824.

A first end of the third bearing 820 is disposed in the form of a stick bearing between the upper vertical portion 710 and the lower vertical portion 510 while being in close contact with the upper vertical portion 710 and the lower vertical portion 510, and a second end of the third bearing 820 extends in the second direction 2 from the first end and is in close contact with the upper vertical portion 710 and the lower vertical portion 510.

A first end of the third bearing 850 is disposed in the form of a stick bearing between the upper vertical portion 730 and the lower vertical portion 530 while being in close contact with the upper vertical portion 730 and the lower vertical portion 530, and a second end of the third bearing 820 extends in the second direction 2 from the first end and is in close contact with the upper vertical portion 730 and the lower vertical portion 530.

A first end of the retainer 822 is formed to surround the balls 824 disposed on the protrusion 511 and spaced apart from each other in a forward-backward direction and surround the balls 824 disposed under the protrusion 511 and spaced apart from each other in the forward-backward direction. A second end of the retainer 822 extends in the second direction 2 from the first end and is formed to surround the balls 824 arranged in the same manner as the balls 824 near the first end.

Each of the balls 824 is formed so as to protrude outward from the retainer 822 and is in close contact with the inner side surface of the upper rail 705 and the protrusion 511, thereby maintaining a constant distance between the upper vertical portion 710 and the protrusion 511.

The first end of the retainer 822 is formed to surround the balls 824 disposed on the protrusion 531 and spaced apart from each other in the forward-backward direction and surround the balls 824 disposed under the protrusion 531 and spaced apart from each other in the forward-backward direction. The second end of the retainer 822 extends in the second direction 2 from the first end and is formed to surround the balls 824 arranged in the same manner as the balls 824 near the first end.

Each of the balls 824 is formed so as to protrude outward from the retainer 822 and is in close contact with the inner side surface of the upper rail 705 and the protrusion 531, thereby maintaining a constant distance between the upper vertical portion 730 and the protrusion 531.

Each of the first to third bearings 810, 820, and 830 is disposed between the lower rail 500 and the upper rail 705 to prevent a gap between the lower rail 500 and the upper rail 705 from being increased and to facilitate smooth movement between the lower rail 500 and the upper rail 705.

On the other hand, the seat elevating device 100 can change the upward movement direction or the downward movement direction of the elevating unit by changing the second posts 430 and 440, the second hooks 460 and 462, and the brackets 250 and 252.

For example, by changing the second posts 430 and 440 provided with the respective sliding grooves 432 and 442 extending in a vertical direction perpendicular to the ground, the second end of the gear unit 450 vertically extending in the same direction as the sliding groove 432, the second hooks 460 and 462 extending in the dame direction as the sliding groove 432, and the brackets 250 and 252 slidably engaged with the respective second hooks 460 and 462, it is possible to raise or lower the elevating unit 400 in the vertical direction perpendicular to the ground surface.

Therefore, the seat elevating device 100 can raise and lower the elevating unit 400 in various directions by changing the second posts 430 and 440, the second hooks 460 and 462, and the brackets 250 and 252.

Although the exemplary embodiments described herein and the configurations illustrated in the drawings are presented for illustrative purposes and do not exhaustively present the technical spirit of the present disclosure. Accordingly, it should be appreciated that there will be various equivalents and modifications that can replace the exemplary embodiments and the configurations at the time at which the present application is filed. Therefore, it should be understood that the above-described embodiments are considered to be illustrative in all respects but are not considered as to be restrictive. The scope of the present disclosure should be defined by the appended claims rather than the foregoing description, and all changes or modifications that can be derived from the meaning, scope, and equivalent concept of the claims should be construed as falling within the scope of the present disclosure.

What is claimed:

1. A seat elevating device comprising:
    a support unit having a first end portion coupled to a body of a vehicle and a second end portion extending upward from the first end portion, surrounding a space, and being connected to a first end and a second end of a bar;
    a driving unit coupled to an inner side surface of the support unit and equipped with a drive shaft on a side surface thereof; and
    an elevating unit connected to the drive shaft through a gear engagement, provided with a sliding groove into which the bar is to be inserted, and coupled to the support unit in a manner to slide in a direction having a vertical direction component,
    wherein the elevating unit is movable by being engaged with a gear connected to the drive shaft via a rack gear extending in a direction parallel to a sliding movement direction thereof,
    wherein the support unit comprises a base plate, first posts respectively coupled to respective upper portions of first and second sides of the base plate, and a roller post connected between the first posts and coupled to an upper end of the driving unit.

2. The device according to claim 1, wherein each of the first posts is structured such that a first one end portion thereof is in close contact with a first and a second side of the base plate, and a second end portion thereof has a triangular plate shape tapered to the top and extends from an inner portion of the first end portion, wherein the triangular plate-shaped second end portions of the respective first posts face in parallel with each other.

3. The device according to claim 1, wherein the support unit comprises a bracket structured such that a first end portion thereof has a rectangular plate shape and is coupled to a lower portion of an outer side surface of the support unit and a second end portion thereof extends toward the drive shaft and is pivotably coupled to the drive shaft.

4. The device according to claim 1, wherein the support unit comprises a shock absorber structured such that a first end portion thereof is pivotably coupled to a side surface of the support unit and a second end portion thereof extends upward in parallel with the sliding movement direction and is pivotably coupled to the elevating unit.

5. The device according to claim 1, wherein the support unit comprises a first hook that is coupled to a side surface of the second end portion, has a hook-shaped cross-section, and extends upward in parallel with the sliding movement direction of the elevating unit.

6. The device according to claim 5, wherein the elevating unit comprises: two second posts respectively inserted into both sides of the driving unit; a rack-type gear unit engaged with either one of the two second posts; and a second hook coupled to either one of the two second posts and slidably coupled to the first hook.

7. The device according to claim 1, wherein the elevating unit comprises: a lower rail having lower side walls on the top thereof; an upper rail disposed on the lower rail, coupled to a seat, and having upper side walls configured to cross the lower side walls and disposed on the bottom thereof; and bearings respectively disposed between the upper side walls and the lower side walls.

8. A seat elevating device comprising:
    a support unit having a first end portion coupled to a body of a vehicle and a second end portion extending upward from the first end portion, surrounding a space, and being connected to a first end and a second end of a bar;
    a driving unit coupled to an inner side surface of the support unit and equipped with a drive shaft on a side surface thereof; and
    an elevating unit connected to the drive shaft through a gear engagement, provided with a sliding groove into which the bar is to be inserted, and coupled to the support unit in a manner to slide in a direction having a vertical direction component,
    wherein the elevating unit is movable by being engaged with a gear connected to the drive shaft via a rack gear extending in a direction parallel to a sliding movement direction thereof, wherein the support unit comprises:
- a) a bracket structured such that a first end portion thereof has a rectangular plate shape and is coupled to a lower portion of an outer side surface of the support unit and a second end portion thereof extends toward the drive shaft and is pivotably coupled to the drive shaft; or
- b) a shock absorber structured such that a first end portion thereof is pivotably coupled to a side surface of the support unit and a second end portion thereof extends upward in parallel with the sliding movement direction and is pivotably coupled to the elevating unit.

9. A seat elevating device comprising:

a support unit having a first end portion coupled to a body of a vehicle and a second end portion extending upward from the first end portion, surrounding a space, and being connected to a first end and a second end of a bar;

a driving unit coupled to an inner side surface of the support unit and equipped with a drive shaft on a side surface thereof; and an elevating unit connected to the drive shaft through a gear engagement, provided with a sliding groove into which the bar is to be inserted, and coupled to the support unit in a manner to slide in a direction having a vertical direction component, wherein the elevating unit is movable by being engaged with a gear connected to the drive shaft via a rack gear extending in a direction parallel to a sliding movement direction thereof, wherein the elevating unit comprises: a lower rail having lower side walls on the top thereof; an upper rail disposed on the lower rail, coupled to a seat, and having upper side walls configured to cross the lower side walls and disposed on the bottom thereof; and bearings respectively disposed between the upper side walls and the lower side walls.

* * * * *